Oct. 13, 1953   L. C. HESTER   2,655,087
DITCHING SIDE PLOW FOR USE ON TRACTORS
Filed July 28, 1948   3 Sheets-Sheet 1

Inventor
Levi C. Hester

Oct. 13, 1953     L. C. HESTER     2,655,087
DITCHING SIDE PLOW FOR USE ON TRACTORS
Filed July 28, 1948     3 Sheets-Sheet 2
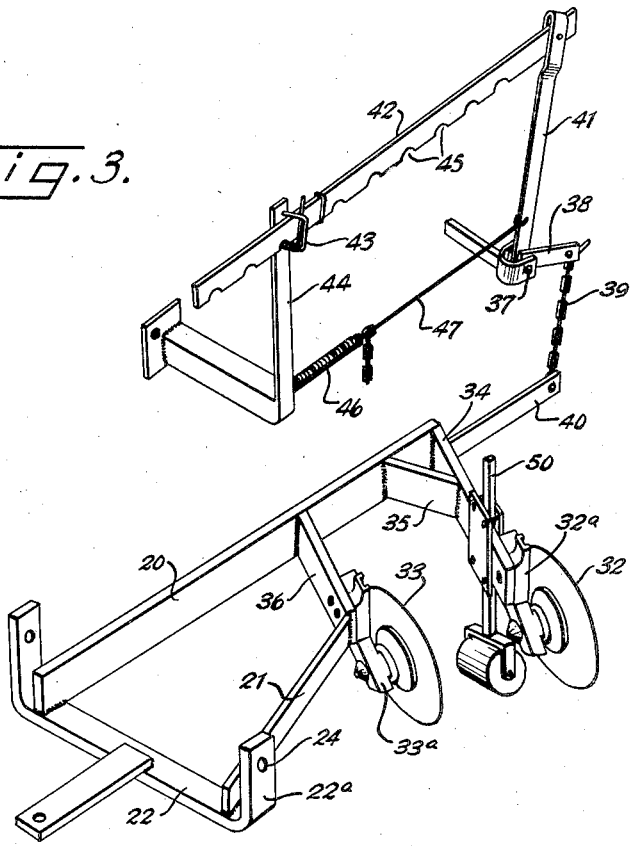
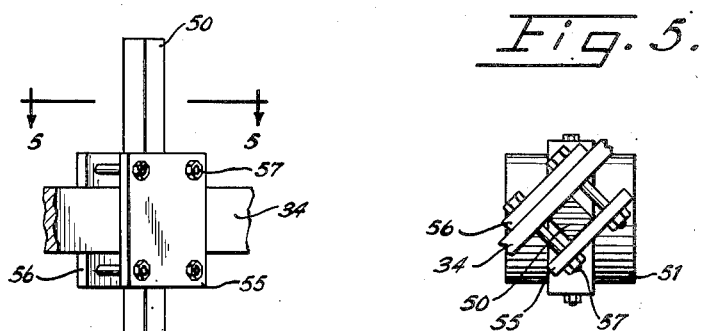
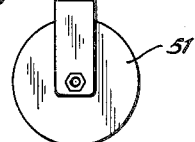

Oct. 13, 1953 L. C. HESTER 2,655,087
DITCHING SIDE PLOW FOR USE ON TRACTORS
Filed July 28, 1948 3 Sheets-Sheet 3
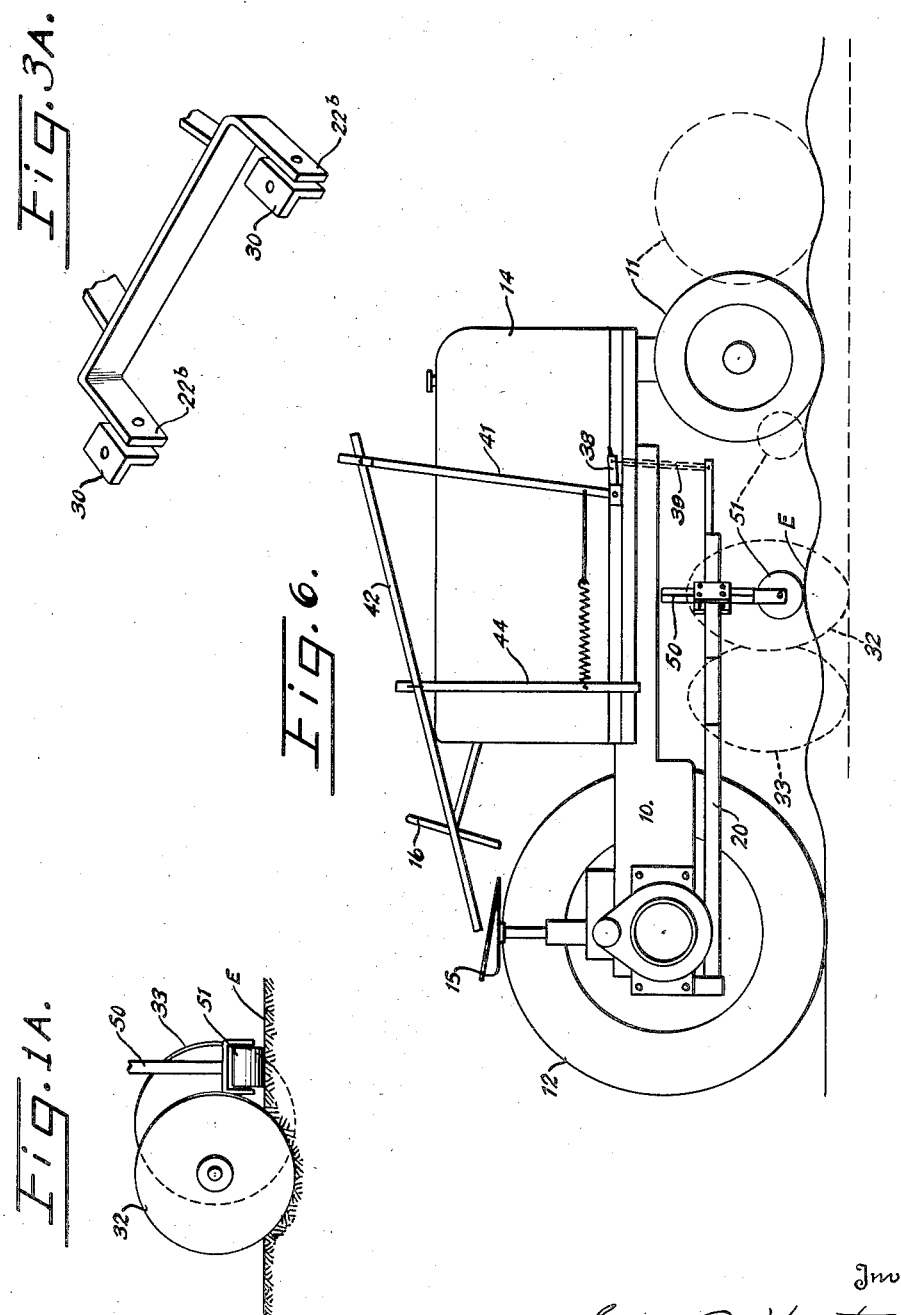
Inventor
Levi C. Hester Patented Oct. 13, 1953

2,655,087

UNITED STATES PATENT OFFICE 2,655,087

DITCHING SIDE PLOW FOR USE ON TRACTORS

Levi C. Hester, Jacksonville, Fla., assignor to Hester Plow Co. Inc., Jacksonville, Fla., a corporation of Florida Application July 28, 1948, Serial No. 41,132

2 Claims. (Cl. 97—47.38)

My present invention has for its object to provide an improved side plow for use on tractors which is especially designed for cutting ditches or plowing furrows extending crosswise of furrows previously existing in a field such as irrigation water courses which are uniformly parallel and form the ground surface with a series of waves or undulations.

Another object of my invention is to provide a tractor-side-plow mounting by means of which the discs or cutting elements are yieldingly supported and may be set for a desired depth of cut and are maintained substantially in such position irrespective of the up and down movement imparted to the tractor as its wheels traverse slight irregularities in the ground surface.

To these and other ends my invention comprises further improvements and advantages as will be further described in the accompanying specification, the novel features thereof being set forth in the appended claims.

In the drawings:

Figure 1 is a top plan view of a tractor showing a side plow embodying my invention applied thereto.

Figure 1ª is a diagrammatic view looking in the direction of the arrows on section line X—X of Fig. 1, as when viewing the plow discs in a horizontal plane when lowered into cutting position.

Figure 3 is a perspective view showing the plow mechanism itself and its adjusting device.

Figure 3ª is a fragmentary detail perspective view showing a slightly different arrangement of the yoke piece.

Figure 4 is a detail view of the ground engaging and plow stabilizing roller used for maintaining the adjusted vertical position of the plow.

Figure 5 is a horizontal sectional view taken on the line 5—5 of Fig. 4.

Figure 2:
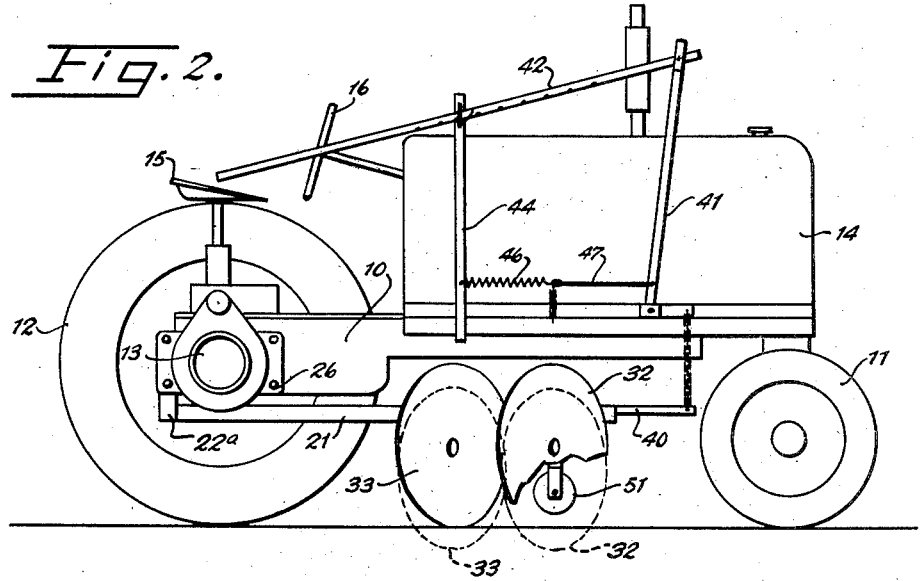
Figure 2 is a side view of the parts shown in Fig. 1.

Figure 6 is a schematic view similar to Fig. 2 showing the tractor in two of the different positions it assumes in travelling across an uneven or wavy ground surface and the concurrent operation of the plow stabilizing roller, only one of the discs in these illustrations being shown.

Similar reference numerals, in the several figures, indicate similar parts.

In the drawings I have shown a farm tricycle tractor comprising a frame 10 mounted on a pair of forward steering wheels 11 and a pair of rear driving wheels 12 at the opposite ends of a rear axle 13, containing the usual differential drive to which power is delivered by the motor mounted on the frame beneath the hood 14. The driver's seat is indicated by 15 in front of which is located the usual steering wheel 16 for controlling the directional movement of the front wheels 11.

The plow per se is shown particularly in Fig. 3. It comprises a framework suitably constructed for pivotal movement on the rear tractor axle 13 and carrying at one side of the tractor one or more disc plows in staggered relation, means being provided whereby the occupant of the driver's seat may conveniently raise or lower the forward end of the frame. The important feature in this general construction resides in the manner in which the frame is connected by a yoke to the two ends of the tractor axle and is shaped to carry a plurality of discs located at the side of the tractor. More specifically the plow frame is formed with a diagonally extending rail 20 reaching from a point well forward on one side of the tractor frame 10 to a point below and in rear of the far or opposite end of axle 13 and a straight side rail 21 extending forwardly from the other end of said axle and parallel to the frame 10. Connection between the rear ends of the rails 20 and 21 and the axle 13 is effected by means of a yoke 22 pivotally connected to the tractor axle. In certain instances the ends 22ª of the yoke may extend upwardly as shown in Fig. 3 and be provided with perforations 24 for the reception of bolts 26 on which the yoke is pivoted and by means of which it is attached to brackets 27 on the ends of the axle 13 adjacent the inner faces of the drive wheels.

In other cases the yoke ends 22ᵇ may extend rearwardly, as shown in Fig. 3ª, and be pivotally connected to cheek pieces 30 which latter are connected rigidly to the lower side of the tractor axle 13.

The supports for the plow discs 32, 33 are formed by an outwardly and rearwardly inclined arm 34 on the forward end of rail 20, against which it is braced by a bracket 35, and the forward end of the side rail 21 which is likewise braced by connecting it to rail 20 by a cross piece 36.

The journals on which the discs 32, 33 are carried are located in a plane below the supporting frame to which they are connected by brackets 32ª, 33ª, respectively.

The adjustment of the disc carrying frame about the pivotal points of its yoke, to regulate the depth of the cutting action of the discs in the soil, is effected by means of a bell crank lever, pivoted to the frame 10 at 37, having a short arm 38 attached by a chain 39 to an extension 40 on the forward end of rail 20. The long arm 41 of the lever is operated manually by a push-pull rod 42 guided in a loop 43 on a bracket 44 and having on its lower side a series of holding notches 45. Also attached to bracket 44 is a coil spring 46 connected by a rod 47 to lever arm 41.

From inspection of Fig. 2 it will be observed that the frame carrying the discs may be elevated out of engagement with the ground surface or released to permit the discs to cut into the soil any desired depth within the normal limits of their operation, and that unless the movement of the frame is otherwise regulated the contour of the bottom of the furrow will be determined by the contour of the ground surface over which the front wheels of the tractor travel. In some plowing operations this is of no consequence while in others it is a very important factor and I have invented a means for controlling the downward movement of the frame during the vertical rocking of the tractor frame as the front wheels pass over successive ridges and into intervening valleys existing in the ground surface.

In carrying out this feature of my invention I mount on the forward arm 34 of the disc carrying frame, in rear of the forward disc 32, a vertically adjustable post 50 carrying at its lower end a broad faced roller 51 rotatable on an axis which is parallel to that of the tractor axle 13. In other words this roller accurately follows the direction of travel of the tractor and may be set in a fixed position to determine the bottom depth of the cut made by the discs at all times.

Figure 1:
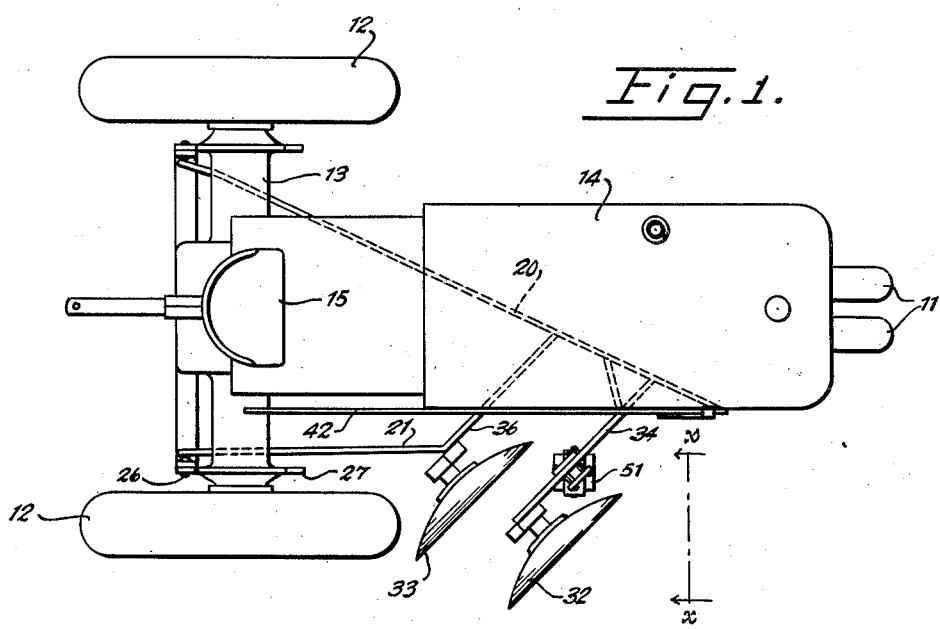

The position of roller 51 with reference to the forward disc 32 is shown particularly in Fig. 1ᵃ in which the discs are shown in cutting position, the undisturbed earth in rear of disc 32 with which the roller engages being indicated by E. This automatic regulation of the operation of the discs is especially important in ditching operations on uneven ground and when cutting ditches in irrigated lands where said ditches run crosswise of the plowed furrows or water contours. The action of the tractor in traversing such contours is illustrated in Fig. 6 and from which it will be seen that while the tractor frame 10 has an up and down rocking movement as the wheels 11 drop into successive contours and mount the intervening ridges that the disc carrying frame remains in its initially set horizontal plane. This is due to the working position of the roller 51 in rear of the steering wheels 11 a sufficient distance to locate the support for the front of the tractor approximately one and one half water contours in the field ahead of the bearing point of roller 51 so that when the wheels 11 are at the bottom of a trough the roller will be riding on the crest or ridge of the second preceding water course and hold the disc frame horizontally.

By employing a flexible connection, such as the chain 39, between the front end of the plow frame and the adjusting mechanism therefor, on the tractor, it becomes possible for the plow frame, when once adjusted to remain in the same horizontal position, since the stabilizing roller 51 by engagement with the ground supports the frame hence as the tractor wheels 11 are elevated by riding over successive ridges said chain or connection being relieved of all weight merely slackens.

I have mentioned the vertical adjustability of the roller 51 and would also call attention to its adjustability sidewise. To this end the post 50 is preferably a rod of rectangular cross section one side of which bears against the forward face of arm 34 against which it is clamped by plates 55—56 drawn together by bolts 57.

In the initial setting of roller 51 cognizance is taken of the average heights of the ridges of the water contours, or other wavy surfaces of the surface of the field across which the ditch is to run and the roller 51 set with reference to the depth of cut to be made by the lower edges of the discs as measured from the tops of said crests. In this way the bottom of the ditch will be practically a straight line instead of following the undulations of the ground surface traversed by the wheels of the vehicle.

I claim:

1. A side plow for use in cutting furrows transverse to previously cut parallel and substantially equally spaced furrows, said plow being adapted to be used with a tricycle type tractor having a front wheel and rear wheels and an axle connecting said rear wheels, comprising a rigid frame having a forked rearward portion with means for pivoting it to the tractor at spaced points adjacent the rear axle of the tractor and on opposite sides of the longitudinal center line of the tractor, said frame having one member thereof which is formed to extend forwardly and outwardly along one side of the tractor at an acute angle to said center line, an outwardly and rearwardly extending arm on the forward end of said frame member, a plowing disc carried on the outer end of said arm, a vertical post secured to said arm and having a depth gauge roller mounted on the lower end thereof, said depth gauge roller being positioned to engage the uncut ground surface inwardly of said disc to limit the downward movement of said frame and being positioned with respect to the front wheel of the tractor to ride on the crest of a furrow transverse to the direction of travel of the tractor when the front wheel of said tractor is riding in a depression of a furrow transverse to the direction of travel of the tractor, said depth gauge roller being adjustable vertically with respect to said arm and longitudinally with respect to said front wheel, said disc and said roller being positioned on said one side of the tractor between the front wheel and the rear drive wheels of the tractor, said disc being positioned in forward alignment of one of said rear drive wheels, and means for suspending the forward end of said frame from the tractor which provides for limited movement of said frame around its pivoted connection to the tractor, said means being adjustable to provide for supporting the forward end of the said frame with said roller when the front wheel of the tractor enters a depression in the ground being plowed and to limit the downward movement of the forward end of said frame including said roller when the front wheel of the tractor passes over a crest of the ground being plowed.

2. A side plow for cutting furrows transverse to previously cut parallel and substantially equally spaced furrows adapted to be used with a tricycle type tractor having a front wheel and rear drive wheels and an axle connecting said rear wheels, comprising a rigid frame having a forked rearward portion with means for pivoting it to the tractor at spaced joints adjacent the rear axle of the tractor and on opposite sides of the longitudinal center line of the tractor, said frame having one member thereof which is formed to extend forwardly and outwardly along one side of the tractor at an acute angle to said center line, an outwardly and rearwardly extending arm on the forward end of said frame member, a plowing disc carried on the outer end of said arm, a vertical post rectangular in cross section having one of its faces engaging said arm, clamping plates embracing said arm and said post and having clamping portions permitting vertical adjustment of said post in relation to said arm and longitudinal adjustment of said post with respect to said front wheel, a depth gauge roller carried by said post on the lower end thereof, said roller being positioned to engage the uncut ground surface inwardly of said disc to limit the downward movement of said frame and being positioned with respect to the front wheel of the tractor to ride on the crest of a furrow transverse to the direction of travel of the tractor while the front wheel of the tractor is riding in a depression of a furrow transverse to the direction of travel of the tractor, said depth gauge roller being adjustable vertically with respect to said arm and longitudinally with respect to said front wheel, said disc and said roller being positioned on said one side of the tractor between the front wheel and the rear drive wheels of the tractor, said disc being positioned in forward alignment of one of said rear drive wheels, and means for suspending the forward end of said frame from the tractor which provides for limited movement of said frame around its pivoted connection to the tractor, said means being adjustable to provide for supporting the forward end of the said frame with said roller when the front wheel of the tractor enters a depression in the ground being plowed and to limit the downward movement of the forward end of said frame including said roller when the front wheel of the tractor passes over a crest of the ground being plowed.

LEVI C. HESTER.

References Cited in the file of this patent

UNITED STATES PATENTS

| Number | Name | Date |
|---|---|---|
| Re. 21,855 | Fleck | July 15, 1941 |
| Re. 22,471 | Hollis | Apr. 18, 1944 |
| 1,116,709 | Jones | Nov. 19, 1914 |
| 1,148,420 | Wihs et al. | July 27, 1915 |
| 1,301,627 | Weaver | Apr. 22, 1919 |
| 1,361,638 | Stephenson | Dec. 7, 1920 |
| 1,614,673 | Hester | Jan. 18, 1927 |
| 1,729,639 | Altgelt | Oct. 1, 1929 |
| 1,870,740 | Leiter | Aug. 9, 1932 |
| 2,041,832 | Hester | May 26, 1936 |
| 2,227,423 | Boyd | Jan. 7, 1941 |
| 2,368,312 | Luger | Jan. 30, 1945 |